US012568946B2

(12) United States Patent
Honda et al.

(10) Patent No.: US 12,568,946 B2
(45) Date of Patent: Mar. 10, 2026

(54) METHOD FOR FACILITATING DELIVERY OF POISON BAIT TO WASP NEST

(71) Applicant: EARTH CORPORATION, Tokyo (JP)

(72) Inventors: Hiroyuki Honda, Ako City (JP); Kazuki Maeda, Ako City (JP); Ren Abe, Ako City (JP)

(73) Assignee: EARTH CORPORATION, Tokyo (JP)

( * ) Notice: Subject to any disclaimer, the term of this patent is extended or adjusted under 35 U.S.C. 154(b) by 695 days.

(21) Appl. No.: 17/637,331

(22) PCT Filed: Aug. 25, 2020

(86) PCT No.: PCT/JP2020/031948
§ 371 (c)(1),
(2) Date: Feb. 22, 2022

(87) PCT Pub. No.: WO2021/039757
PCT Pub. Date: Mar. 4, 2021

(65) Prior Publication Data
US 2022/0272958 A1 Sep. 1, 2022

(30) Foreign Application Priority Data

Aug. 27, 2019 (JP) ................................. 2019-154666
Jan. 17, 2020 (JP) ................................. 2020-006295

(51) Int. Cl.
*A01M 1/20* (2006.01)
*A01M 1/02* (2006.01)

(52) U.S. Cl.
CPC ............ *A01M 1/2016* (2013.01); *A01M 1/02* (2013.01)

(58) Field of Classification Search
CPC .............................. A01M 1/2016; A01M 1/02
See application file for complete search history.

(56) References Cited

U.S. PATENT DOCUMENTS 5,033,229 A * 7/1991 Demarest ............. A01M 1/2011
43/132.1

FOREIGN PATENT DOCUMENTS

JP          H09202701 A      8/1997
JP          2003238317 A  *  8/2003

| | | |
|---|---|---|
| JP | 2007176853 A | 7/2007 |
| JP | 2011144151 A | 7/2011 |
| JP | 2015093846 A | 5/2015 |
| JP | 2017178793 A | 10/2017 |

OTHER PUBLICATIONS

English translation of JP-2003238317-A provided by applicant (Year: 2020).*
WHY® Trap for Wasps, Hornets, & Yellowjackets (downloaded Mar. 14, 2025 from https://www.rescue.com/products/traps/why-trap-for-wasps-hornetsyellowjackets/; available on the Internet Oct. 31, 2017 (Year: 2017).*
J. Suszkiw USDA, Commercial trap for wasps, downloaded Mar. 15, 2025 from: https://www.ars.usda.gov/news-events/news/research-news/2010/ commercial-trap-for-wasps-hornets-and-yellow-jackets-baited-with-usda-technology/#:~:text=Fortunately %2C%20a% 20new%20trap%20is,has%20licensed%20it%20to%20Sterling (Year: 2010).*
J. P. Beach, L. Williams III, D. L. Hend. Different Food Sources Affect the Gustatory Response of Anaphes iole, An Egg Parasitoid of *Lygus* SPP. Journal of Chemical Ecology, vol. 29, No. 5, May 2003. . (Year: 2003).*
International Search Report (ISR) mailed Oct. 6, 2020, issued for International application No. PCT/JP2020/031948. (2 pages).
International Preliminary Report on Patentability, dated Mar. 1, 2022, for corresponding international application PCT/JP2020/031948 (1 page).
Notification Concerning Transmittal of International Preliminary Report on Patentability, mailed Mar. 10, 2022, for corresponding international application PCT/JP2020/031948 (1 page).
Notification of Transmittal of Translation of the International Preliminary Report on Patentability, mailed Mar. 10, 2022, for corresponding international application PCT/JP2020/031948 (1 page).
Written Opinion of the International Searching Authority, mailed Oct. 6, 2020, for corresponding international application PCT/JP2020/031948 (3 page).
A Patent Examination Report 1 issued by the New Zealand Intellectual Property Office, dated May 15, 2024, for counterpart application No. 786464 (4 pages).
Vespex [retrieved from internet on May 15, 2024]. Retrieved from (2 pages).

* cited by examiner

*Primary Examiner* — Michael P Cohen
(74) *Attorney, Agent, or Firm* — Law Office of Katsuhiro Arai

(57) ABSTRACT

An object is to provide a method for facilitating the delivery of a poison bait to a wasp nest and a method for destroying the wasp nest early. As a solution, a method for facilitating the delivery of a poison bait to a nest by a wasp, in which the poison bait has a sugar content (Brix) of 40 or more and less than 83, is provided.

2 Claims, 1 Drawing Sheet

METHOD FOR FACILITATING DELIVERY OF POISON BAIT TO WASP NEST

TECHNICAL FIELD

The present invention relates to a method for facilitating the delivery of a poison bait to a wasp nest.

BACKGROUND ART

In recent years, damage by wasps has increased and become a problem. About 3000 species of wasps and bees are known in Japan, and among them, about 20 species are said to be carnivorous wasps having strong stinging properties. Among carnivorous wasps, wasps belonging to the family Vespidae such as hornets and paper wasps, which are highly aggressive species, are pest species with very high demand for extermination because their sting may cause anaphylactic shock and they can perform multiple attacks due to the structure of their stinger, and immediate action is required when they are exterminated.

Carnivorous wasps sometimes nest under the eaves or in the ceiling space of private houses, and in urban districts, since the living area of people and the range of activity of carnivorous wasps overlap each other, damage due to sting tends to occur frequently. Since carnivorous wasps are belligerent, people unknowingly approaching their nest may be attacked and damaged. For example, about 10 to 20 people who die from being stung by a carnivorous wasp are reported every year.

Currently, wasps are exterminated typically by directly spraying a liquid or aerosol agent containing an insecticidal active ingredient onto wasps, and many aerosol agents containing fast-acting pyrethroid insecticides and the like as active ingredients have been proposed (for example, PTLs 1 to 3). However, even when these aerosol agents are used, it is sometimes impossible to spray a sufficient amount onto each individual, or in some cases, excited wasps emit alarm pheromones before an insecticidal effect is exhibited to attract more excited wasps, and these wasps carry out attacks. Furthermore, although liquid agents and aerosol agents can exterminate sprayed wasps, these agents unfortunately cannot exterminate many wasps in the nest and cannot suppress the reoccurrence of damage.

Under these circumstances, methods involving making wasps bring a poison bait back to their nest to exterminate wasps in the nest and destroy the nest have been expected as wasp extermination methods other than liquid agents and aerosol agents.

CITATION LIST

Patent Literature

PTL 1: Japanese Unexamined Patent Application Publication No. 2017-178793
PTL 2: Japanese Unexamined Patent Application Publication No. 2015-093846
PTL 3: Japanese Unexamined Patent Application Publication No. 2011-144151

SUMMARY OF INVENTION

Technical Problem

To increase the wasp-exterminating effect of a poison bait, it is effective to increase palatability. Wasps have a habit of returning to their nest after eating a food and giving the food to other wasps in the nest in a mouth-to-mouth manner. Therefore, by making a wasp that has eaten a poison bait deliver the poison bait to its nest to efficiently propagate the insecticidal effect of the poison bait to other wasps, the wasp nest can be destroyed more effectively.

Thus, an object of the present invention is to facilitate the delivery of a poison bait to a wasp nest, and further to destroy the wasp nest early.

Solution to Problem

To solve the above problems, the present inventors have conducted intensive studies and found that a poison bait having a sugar content (Brix) of 40 or more and less than 83 can increase the palatability to wasps to facilitate the delivery of the poison bait to a wasp nest and further destroy the wasp nest early, thereby solving the above problems.

Specifically, the gist of the present invention is as follows.
1. A method for facilitating the delivery of a poison bait to a nest by a wasp, in which the poison bait has a sugar content (Brix) of 40 or more and less than 83.

Advantageous Effects of Invention

According to the present invention, since the poison bait has a sugar content (Brix) of 40 or more and less than 83, the palatability to wasps can be increased to facilitate the delivery of the poison bait to a wasp nest, and thus a high extermination effect on wasps can be exhibited to efficiently destroy the entire wasp nest, which is beneficial. When the poison bait has a sugar content (Brix) of 40 or more, even if the poison bait is infiltrated, attached, or applied to a carrier in much contact with air, the generation of mold and the like is greatly reduced, and the decay of the poison bait is suppressed, so that the extermination effect on wasps does not decrease.

Furthermore, when the poison bait having a sugar content (Brix) of 40 or more and less than 83 is disposed in an area at least one meter away from a wasp nest and within three meters from the line of movement of wasps, the wasps recognize the poison bait as a new food or a new feeding site at an early point in time, and consequently the entire wasp nest can be destroyed early. In the present invention, the term "early" in the context of destroying the entire wasp nest early means within two weeks after the poison bait is disposed in the above area.

DESCRIPTION OF EMBODIMENTS

Figures 1, 2:
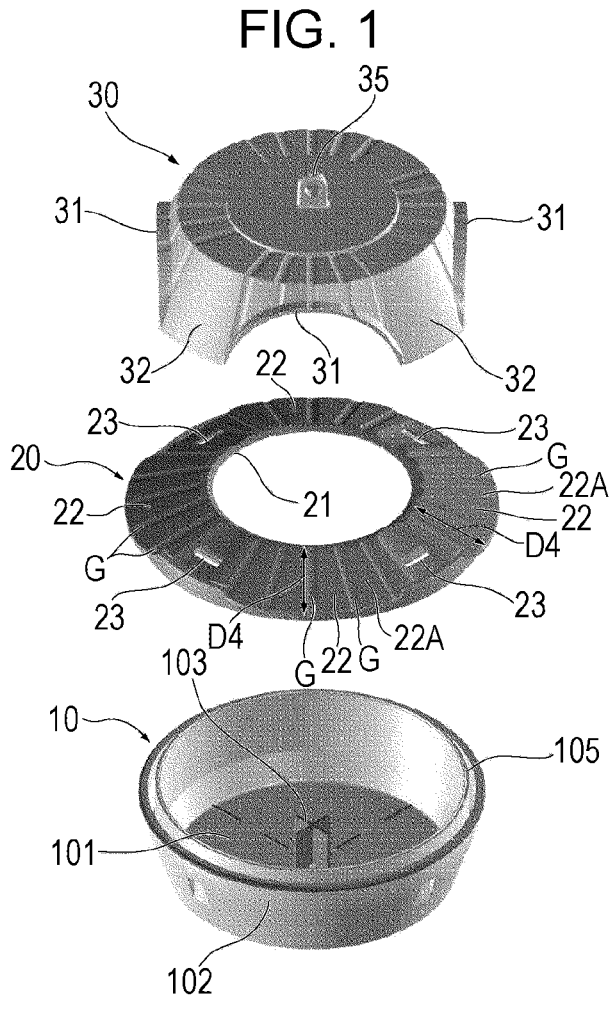
FIG. 1 is an exploded perspective view of a specific embodiment of a wasp poison bait container for housing a poison bait in the present invention, provided that a liquid-absorbing member is excluded.
FIG. 2 is a perspective view of the wasp poison bait container illustrated in FIG. 1 from which an inner lid and an umbrella are removed.

Hereinafter, the present invention will be described in detail.

The present invention is characterized in that the sugar content (Brix) of a poison bait is 40 or more and less than 83.

<Sugar Content (Brix)>

The sugar content (Brix) in the present invention is a sugar refractometer reading at 20° C. and means a numerical value obtained by measuring the whole poison bait used for wasp extermination at 20° C. using a digital refractometer PAL-1 (manufactured by ATAGO CO., LTD.). Since the measurement range of the digital refractometer PAL-1 (manufactured by ATAGO CO., LTD.) is 0.0 to 53.0 (Brix), poison baits having a sugar content (Brix) of higher than 53.0 were 10-fold diluted with ion-exchanged water, and the measured values thereof were multiplied by 10. In the case of poison baits other than liquid formulations, the poison baits were 10-fold diluted with ion-exchanged water, and the measured values were multiplied by 10 to determine the sugar content.

The sugar content (Brix) of a poison bait in the present invention is 40 or more, and is preferably 50 or more, more preferably 60 or more. The upper limit of the sugar content (Brix) of the poison bait is less than 83.

In the present invention, since the sugar content (Brix) of the poison bait is 40 or more, not only the palatability to wasps can be improved, but also the behavior of wasps delivering the poison bait to their nest can be facilitated. As a result, the delivered poison bait is given to other wasps in the nest, and the poison bait is propagated throughout the entire nest to exhibit an excellent extermination effect of destroying the nest.

This is the first time to find that a sugar content (Brix) of 40 or more and less than 83 facilitates the delivery to the nest. Wasps are attracted from their nest to the poison bait and made to bring the poison bait into the nest, whereby the entire nest can be destroyed in the end.

<Wasp>

The wasps to be exterminated in the present invention are mainly wasps belonging to the family Vespidae, and examples include those belonging to hymenopteran pests, such as bethylid wasps, carpenter bees, spider wasps, thread-waisted wasps, and potter wasps. In particular, examples of Vespidae wasps include wasps belonging to the subfamilies Vespinae and Polistinae.

Examples of wasps belonging to the subfamily Vespinae include *Vespa mandarinia*, *Vespa simillima xanthoptera*, *Vespa analis*, *Vespa crabro*, *Vespa ducalis*, *Vespa dybowskii*, *Vespula flaviceps*, *Vespula shidai*, *Vespula austriaca*, and *Vespa velutina*.

Examples of wasps belonging to the subfamily Polistinae include *Polistes rothneyi*, *Polistes jokahamae*, *Polistes chinensis*, *Polistes riparius*, *Polistes japonicus*, *Polistes nipponensis*, *Polistes snelleni*, *Polistes rothneyi yayeyamae*, *Parapolybia indica*, and *Parapolybia varia*.

<Saccharides>

For the poison bait in the present invention to have a sugar content (Brix) of 40 or more and less than 83, it is preferable to adjust the sugar content of the whole poison bait by incorporation of sugars such as white superior soft sugar, soft brown sugar, and brown sugar, starch saccharides such as starch syrup and glucose, honey, molasses, lactic acid products (e.g., lactic acid bacteria beverages), fruits, processed fruit products, fruit juices, fruit juice beverages, and the like. These may be used alone or as a mixture of two or more.

It is also preferable to adjust the sugar content (Brix) of the poison bait in the present invention to 40 or more and less than 83 by using blackstrap molasses. Blackstrap molasses is useful because it can selectively attract carnivorous wasps such as hornets and paper wasps. Here, a carnivorous wasp means a flesh-eating wasp that feeds on, for example, non-carnivorous bees such as honeybees, other carnivorous wasps, and other insects. Blackstrap molasses contains furfuryl alcohol, furfural, sotolon, or the like, which is an aroma component.

<Other Attractive Components>

The poison bait in the present invention can be used in combination with a known attractive component in addition to the above-described components. Examples of bases of the known attractive component include vinegars such as balsamic vinegar, cider vinegar, rice vinegar, brown rice vinegar, sake lees vinegar, soybean vinegar, black vinegar, wine vinegar, Citrus sudachi vinegar, red vinegar, persimmon vinegar, malt vinegar, purple sweet potato vinegar, and sugar cane vinegar; liquors such as fruit wine, beer, Japanese sake, shochu, whiskey, brandy, vodka, rum, gin, tequila, Shaoxing wine, baijiu, and laojiu (Chinese brewed liquor); sake lees; sea foods; processed sea food products; sea food extracts; meats; processed meat products; meat extracts; and perfumes. Among these attractive components, liquid attractive components are particularly preferred. Further incorporation of a moisturizing component, such as an aliphatic polyhydric alcohol such as glycerol, a sugar alcohol such as sorbitol, or a polysaccharide thickener such as xanthan gum, enables the attractive component to be efficacious over a long period of time.

<Insecticide>

The poison bait in the present invention can be used in combination with a known insecticide to provide an exterminating agent that can reliably exterminate not only a wasp that has eaten the poison bait but also wasps in the nest. Examples of known insecticides that can be used in combination include various insecticides including pyrethroid compounds such as natural pyrethrin, allethrin, resmethrin, furamethrin, prallethrin, terallethrin, phthalthrin, phenothrin, permethrin, cyphenothrin, cypermethrin, transfluthrin, metofluthrin, profluthrin, imiprothrin, empenthrin, etofenprox, silafluofen, meperfluthrin, and dimefluthrin; carbamate compounds such as propoxur and carbaryl; organophosphorus compounds such as fenitrothion, diazinon, tetrachlorvinphos, and DDVP; oxadiazole compounds such as metoxadiazone; phenylpyrazole compounds such as fipronil; sulfonamide compounds such as amidoflumet; neonicotinoid compounds such as imidacloprid and dinotefuran; juvenile hormone-like compounds such as pyriproxyfen, methoprene, and hydroprene; oxidative phosphorylation uncouplers such as sulfluramid; anti-juvenile hormone-like compounds such as precocene; chitin synthesis inhibitors such as novaluron, diflubenzuron, and etoxazole; amidinohydrazone compounds such as hydramethylnon; and insecticidal essential oils such as phytoncide, peppermint oil, orange oil, cinnamon oil, and clove oil. Furthermore, synergists such as Synepirin and piperonyl butoxide can also be used in combination. In particular, insecticides that are less repellent to wasps and slow-acting, such as diazinon, tetrachlorvinphos, sulfluramid, fipronil, and hydramethylnon, are suitable as insecticides to be incorporated into the poison bait of the present invention.

When incorporated into the poison bait of the present invention, highly water-soluble insecticides may be preferred in terms of formulation. Examples include acephate, vamidothion, methidathion (DMTP), fenobucarb (BPMC), ethiofencarb, cartap, thiocyclam, imidacloprid, thiacloprid, cyromazine, fosthiazate, acetamiprid, thiamethoxam, carbaryl (NAC), clothianidin, pymetrozine, and dinotefuran. Of these, for example, those having a water solubility at 20° C. of 500 ppm or more, such as dinotefuran (water solubility at 20° C.: about 54000 ppm), thiamethoxam (water solubility at 20° C.: about 4100 ppm), imidacloprid (water solubility at 20° C.: about 510 ppm), and fenobucarb (BPMC, water solubility at 20° C.: about 610 ppm), are suitable as insecticides to be incorporated into the poison bait of the present invention.

<Formulation>

The poison bait in the present invention may be in any form as long as it has a sugar content (Brix) of 40 or more and less than 83 when used, and the form may be, for example, a formulation or a solution obtained by diluting the formulation with water. Examples of formulation types include liquid formulations such as oil solutions, emulsions, wettable powders, and flowables (e.g., suspensions in water and emulsions in water), and solid formulations such as gels, pastes, microcapsules, powders, granules, and tablets. In particular, the liquid formulations are suitable because they are easily eaten by wasps. Furthermore, the liquid formulations are suitable also because they are easily diluted with water and leaves little undissolved residue. The water used for the dilution may be, for example, purified water, tap water, ion-exchanged water, distilled water, filtered water, sterilized water, groundwater, or well water.

The poison bait of the present invention is preferably used while being infiltrated, attached, or applied to a carrier made of sponge, polymer such as water-absorbing polymer, absorbent cotton, nonwoven or woven fabric of natural or synthetic fibers, paper, porous material, or the like and housed in a container, furthermore such that rainwater and the like cannot enter the container. Since the poison bait of the present invention has a sugar content (Brix) of 40 or more, for example, even if the poison bait is infiltrated, attached, or applied to a carrier in much contact with air, the generation of mold and the like is greatly reduced. As a result, the decay of the poison bait is suppressed, and the extermination effect on wasps does not decrease.

<Formulation Aid>

In formulating the poison bait in the present invention, a surfactant can be used to the extent that the advantageous effects of the present invention are not impaired. As the surfactant, any of nonionic surfactants, anionic surfactants, cationic surfactants, and amphoteric surfactants can be used without any limitation, and among them, nonionic surfactants and anionic surfactants are suitable.

Specifically, examples of nonionic surfactants include those of sugar ester type, fatty acid ester type, vegetable oil type, alcohol type, alkylphenol type, polyoxyethylene-polyoxypropylene block polymer type, alkylamine type, bisphenol type, and polyaromatic ring type. Examples of anionic surfactants include those of carboxylic acid type, sulfonic acid type, sulfate ester type, and phosphate ester type. Examples of cationic surfactants include those of ammonium type and benzalkonium type. Examples of amphoteric surfactants include those of betaine type.

Examples of especially preferred nonionic surfactants include polyglycerol fatty acid ester, polyoxyalkylene sorbitan fatty acid esters, polyoxyalkylene aryl ethers, polyalkylene glycol fatty acid esters, sucrose fatty acid ester, polyoxyalkylene castor oils, and polyoxyalkylene hydrogenated castor oils, and examples of preferred anionic surfactants include sulfonate salts.

Examples of particularly preferred nonionic surfactants include polyglycerol fatty acid ester, polyoxyethylene sorbitan fatty acid ester, polyoxyethylene aryl ether, polyethylene glycol fatty acid ester, sucrose fatty acid ester, and polyoxyethylene hydrogenated castor oil, and examples of particularly preferred anionic surfactants include alkyl sulfoacetate salts. These surfactants may be used alone or as a mixture of two or more.

The poison bait in the present invention can be formulated while containing components that are commonly added to formulations to the extent that the advantageous effects of the present invention are not impaired. Examples of components that are commonly added to formulations include stabilizers, preservatives, coloring agents, accidental swallowing and eating preventives, and liquid carriers. Examples of stabilizers include antioxidants such as dibutylhydroxytoluene (BHT) and butylhydroxyanisole (BHA), and ascorbic acid. Examples of preservatives include sodium chloride, sorbic acid, sorbate salts, p-hydroxybenzoate esters, and tiabendazole. Examples of coloring agents include caramel coloring, gardenia coloring, anthocyanin coloring, safflower coloring, flavonoid coloring, Red No. 2, Red No. 3, Yellow No. 4, and Yellow No. 5. Examples of accidental swallowing and eating preventives include denatonium benzoate.

Examples of liquid carriers used in formulation include alcohols (e.g., methanol, ethanol, isopropyl alcohol, butanol, hexanol, and ethylene glycol), ethers (e.g., diethyl ether, ethylene glycol dimethyl ether, diethylene glycol monomethyl ether, diethylene glycol monoethyl ether, propylene glycol monomethyl ether, tetrahydrofuran, and dioxane), esters (e.g., ethyl acetate, butyl acetate, isopropyl myristate, and ethyl lactate), ketones (e.g., acetone, methyl ethyl ketone, methyl isobutyl ketone, and cyclohexanone), aromatic or aliphatic hydrocarbons (e.g., xylene, toluene, alkylnaphthalene, phenylxylylethane, kerosene, light oil, hexane, and cyclohexane), halogenated hydrocarbons (e.g., chlorobenzene, dichloromethane, dichloroethane, and trichloroethane), nitriles (e.g., acetonitrile and isobutyronitrile), sulfoxides (e.g., dimethylsulfoxide), heterocyclic solvents (sulfolane, γ-butyrolactone, N-ethyl-2-pyrrolidone, N-octyl-2-pyrrolidone, and 1,3-dimethyl-2-imidazolidinone), acid amides (e.g., N,N-dimethylformamide and N,N-dimethylacetamide), alkylidene carbonates (e.g., propylene carbonate), vegetable oils (e.g., soybean oil and cottonseed oil), essential oils (e.g., orange oil, hyssop oil, and lemon oil), and water.

<Wasp Poison Bait Container>

The poison bait in the present invention is preferably used while being housed in a container.

The container for housing may have any shape and size as long as the poison bait in the present invention can be accommodated therein and may be in any form suitable for the place and manner in which the poison bait is used. The material of the container is not particularly limited as long as it is a material such as glass, metal, plastic, or special paper having a waterproof or water-repellent function that does not allow the poison bait in the present invention to leak out of the container.

For example, the container preferably has a configuration which includes a lid covering an opening of the container and in which an opening through which a wasp enters is formed in either the lid or the container. For easy entry of a wasp into the container, a plurality of openings are preferably formed in the container, and the number of openings formed, while depending on the size of the container, is preferably two or more and five or less. In addition, the shape of the container is preferably such that a wasp that has entered the container can easily go out of the container after eating the poison bait in the present invention.

The container may be provided with a transparent or translucent portion serving as a window or may be a transparent or translucent container.

When the wasp poison bait container is placed outdoors, in order to prevent rainwater and the like from entering the container to dilute the poison bait in the present invention and reduce the wasp-exterminating effect, the container preferably has a configuration including a covering portion that prevents the entry of rainwater and the like while having a space with respect to an opening.

The container housing the poison bait in the present invention is preferably used while being placed on a flat place, such as the ground or a balcony, on which direct sunlight falls as little as possible or where the entrance of the container is not blocked or while being hung at a height of 1 to 3 m from the flat surface of the flat place.

<Specific Example of Wasp Poison Bait Container>

The configuration of a wasp poison bait container 1 suitable for the housing of the poison bait according to the present invention will be described with reference to FIGS. 1 and 2. The wasp poison bait container 1 is configured such that a wasp easily enters the container, while human fingers less easily touch the poison bait according to the present invention, and the effective period of the wasp poison bait can be extended.

The wasp poison bait container 1 includes a lower container 10 (container body: a bottom 101, a side 102, a protrusion 103, an opening 105), an inner lid 20, an umbrella 30, and a liquid-absorbing member 40.

The inner lid 20 is configured to be fixable to the lower container 10 through engagement with the outside of the lower container 10. A wasp gate 21 (opening) communicating with the lower container 10 is formed in the center of the inner lid 20. The inner lid 20 includes a wasp landing port 22 for a wasp to land. The wasp landing port 22 is inclined such that the inner side of the port is higher than the outer edge of the port (inclined such that the height increases from the outer edge of the wasp landing port 22 toward the center). Wasps are sometimes described to have a negative geotaxis, that is, a characteristic of an organism to move in the direction opposite to gravity. A slope 22A (distance D4 from the outer edge to the wasp gate 21) can facilitate walking of a wasp into the wasp poison bait container 1. As illustrated in FIG. 1, a groove G extending in the radial direction may be provided between adjacent slopes 22A. The groove G allows a wasp to hook its legs and thus can help the wasp to climb the slope 22A. The slope 22A may be provided with projections, or recesses and projections.

Due to the presence of the slope 22A, when a human finger is inserted through the gap between the umbrella 30 and the inner lid 20, the inserted finger touches the slope 22A to be guided obliquely upward. Therefore, the finger can be guided in a direction away from the liquid-absorbing member 40 housed in a lower part of the lower container 10. In addition, even if an attempt is made to bend the joints of the finger, the finger hits the umbrella 30 to be inhibited from bending, and thus the possibility that the finger touches the liquid-absorbing member 40 can be reduced.

Furthermore, due to the presence of the slope 22A, wind passing through the wasp poison bait container 1 is guided upward along the slope 22A. This can reduce direct hitting of the wind on the liquid-absorbing member 40, thus making it possible to reduce the variation in the amount of vaporization of the poison bait infiltrated into the liquid-absorbing member 40, and further to reduce the variation in the service life of the liquid-absorbing member 40.

The wasp landing port 22 is formed so as to protrude radially outward from the outer periphery of the lower container 10. Such a configuration in which the wasp landing port 22 is protruded allows a wasp to easily land at the port, and the wasp can enter the inside of the lower container 10 through the wasp gate 21 at the center of the inner lid 20.

In a peripheral portion of the inner lid 20, a plurality of engagement holes 23 for engagement of the lower end of the umbrella 30 (the lower end of a side wall portion 32) are formed.

The umbrella 30 is engaged with the inner lid 20 so as to overlie the wasp gate 21. Due to the engagement of the umbrella 30 with the inner lid 20, the liquid-absorbing member 40 exposed to the outside through the wasp gate 21 is covered by the umbrella 30 from above, and direct hitting of water and the like (e.g., rain) on the liquid-absorbing member 40 from the outside can be reduced. The slope 22A of the inner lid 20 described above also can reduce the entry of water and the like into the lower container 10. The umbrella 30 is provided with an arched opening 31 through which the wasp gate 21 communicates with the outside of the wasp poison bait container 1. A wasp landing at the wasp landing port 22 can enter the inside of the wasp poison bait container 1 (the inside of the umbrella 30) through the arched opening 31, and further enter the inside of the lower container 10 through the wasp gate 21. The side wall portions 32 located on both sides of the arched opening 31 are engaged with the inner lid 20 to fix the umbrella 30 and the inner lid 20 to each other. Here, the height of the arched opening 31 with respect to the slope 22A of the inner lid 20 (the vertical distance between the slope 22A and the middle of the arched opening 31) is preferably 10 mm or more and 35 mm or less, more preferably 10 mm or more and 30 mm or less. When the height of the arched opening 31 from the inner lid 20 is 10 mm or more, even a large wasp such as a hornet can enter the wasp poison bait container 1. However, if the height of the arched opening from the inner lid 20 is more than 35 mm, human fingers are likely to touch the poison bait according to the present invention. In addition, large insects other than wasps may enter the container.

The upper surface of the umbrella 30 is provided with a hanging portion 35 for disposing the wasp poison bait container 1 by hooking it on an external member.

The liquid-absorbing member 40 is an impregnated body impregnated with the poison bait according to the present invention to be eaten by wasps.

As illustrated in FIG. 2, the liquid-absorbing member 40 has a hole 42 (recess) extending from an upper surface 40a side toward a lower surface of a main body (liquid-absorbing member body). The hole 42 need not necessarily be formed only in the liquid-absorbing member 40, and may be formed, for example, between the liquid-absorbing member 40 and the lower container 10 or only in the lower container 10. When the hole 42 is formed only in the lower container 10, it is preferably formed along the periphery of the liquid-absorbing member 40 because a wasp that has entered the inside of the hole 42 can eat the poison bait according to the present invention infiltrated into the liquid-absorbing member 40.

The hole 42 has an opening shape for allowing a wasp to enter the inside thereof, in other words, an opening large enough to receive a wasp's head. Specifically, the diameter of the hole 42 is preferably in the range of 5 to 30 mm. If the diameter of the hole 42 is larger than 30 mm, the inside of the hole 42 is readily dried, and if the diameter of the hole 42 is smaller than 5 mm, it is difficult for a wasp's head to enter the inside of the hole 42. Wasps have a habit of putting their head into a nest hole (for example, hornets and paper wasps have a habit of putting their head into a nest hole to receive a nutrient liquid from a larva in the nest hole in a mouth-to-mouth manner (when a thick liquid is collected in a lower part of the hole 42, a hornet or a paper wasp put its head into the hole and licks the liquid in the lower part of the hole 42)). Because of this habit, wasps eat the poison bait according to the present invention contained inside the hole 42. Therefore, even if the upper surface 40a side of the liquid-absorbing member 40 is dried, this habit of wasps makes wasps eat the poison bait according to the present invention held inside the hole 42 formed in the liquid-absorbing member 40, so that the effective period of the poison bait can be extended.

Although the hole 42 is formed so as to extend from the upper surface 40a side toward the lower surface side of the liquid-absorbing member 40, the direction of the extension may be any direction.

The hole 42 need not extend through the liquid-absorbing member 40 as long as the hole has an opening large enough to receive a wasp's head. For example, the hole 42 preferably extends by half or more the thickness of the liquid-absorbing member 40 because wasps can eat the poison bait according to the present invention contained in the lower surface side that is less likely to dry than the upper surface 40a side that is relatively likely to dry.

While the specific embodiment of the wasp poison bait container 1 has been described above with reference to FIGS. 1 and 2, the size, shape, disposition, number, etc. thereof are not limited to those in this embodiment and can be appropriately changed according to the purpose.

When the poison bait of the present invention having a sugar content (Brix) of 40 or more and less than 83 is disposed in an area at least one meter away from a wasp nest and within three meters from the line of movement of wasps, the wasps recognize the poison bait as a new food or a new feeding site at an early point in time, and consequently the entire wasp nest can be advantageously destroyed early. This preferred disposition is probably due to the fact, for example, that if the poison bait is disposed within one meter from the wasp nest, wasps are wary and reluctant to approach the poison bait, which is a newly emerged artifact, and that if the poison bait is disposed at a point three meters or more away from the line of movement of wasps, it takes a very long time until the wasps recognize the poison bait as a new food or a new feeding site.

That is, it is presumed that when the poison bait of the present invention is disposed in an area at least one meter away from a wasp nest and within three meters from the line of movement of wasps, the wasps reach the poison bait early, so that the delivery of the poison bait to the nest is facilitated, resulting in early destruction of the entire wasp nest.

The phrase "the line of movement of wasps" in the present invention refers to a track of wasps which starts from a wasp nest and along which the wasps come and go between the nest and the current feeding site.

EXAMPLES

Hereinafter, the present invention will be described in more detail with reference to, for example, test sample preparation examples and test examples, but the present invention is not limited to these examples.

In EXAMPLES, "parts" means "parts by weight" unless otherwise specified.

<Verification Test of Palatability Dependent on Sugar Content (Brix) of Poison Bait>

(1) Preparation of Test Sample

Three aqueous fructose solutions having sugar contents (Brix) shown in Table 1 below were prepared as test samples 2 to 4. A sample containing only water and having a sugar content (Brix) of 0 was used as a test sample 1.

(2) Test Method

Each of the test samples 1 to 4 in (1) above in an amount of 1.7 g was infiltrated into a 85 mm×80 mm absorbent cotton piece folded in four and loaded into a circular container (40 mm in diameter×35 mm in height), and the container was placed in a KP cup (130 mm in diameter×100 mm in height). One test insect (*Polistes jokahamae*) was placed therein and observed for one hour to determine the average time (s) per eating occasion.

The sugar contents (Brix) and the eating times (s) of the test samples 1 to 4 are listed in Table 1 below.

TABLE 1

| | Test sample | | | |
| --- | --- | --- | --- | --- |
| | 1 | 2 | 3 | 4 |
| Sugar content (Brix) | 0 | 20 | 40 | 63 |
| Average eating time (s) | 0 | 9 | 129 | 411 |

From the results shown in Table 1, it was revealed that when the sugar content (Brix) was 40 or more (the test samples 3 and 4), the palatability greatly improved. Furthermore, it was also confirmed that when the sugar content (Brix) was 60 or more (the test sample 4), the palatability improved by three times or more as compared to when the sugar content (Brix) was 40 (test sample 3).

This improvement in palatability means recognition by the wasp as a good food or a new feeding site, and it is expected that the wasp that has eaten the bait will deliver the bait to its nest and give (propagate) the bait to other wasps in the nest in a mouth-to-mouth manner. This was verified by the following tests.

<Propagation Verification Test 1>

(1) Preparation of Test Sample

The test samples 2 to 4 used in "Verification test of palatability dependent on sugar content (Brix) of poison bait" above were used.

(2) Test Method

After 2 g of a 0.01 wt % imidacloprid solution in ethanol was added dropwise to a 85 mm×80 mm absorbent cotton piece and then dried, each of the test samples 2 to 4 in an amount of 4 g was infiltrated and made to be eaten by one test insect (honeybee, ♀) fasted overnight. Subsequently, the test insect that had finished eating was put in a metal cage (25 cm×25 cm×25 cm), and additional bees (honeybees: those living in the same nest as the test insect) in a number shown in "Number of additional bees" of Table 2 was put therein. After 14 hours, the number of dead additional bees in the metal cage ("Number of dead additional bees") was counted. The test was performed under room temperature (25° C.) conditions.

The sugar contents (Brix), the numbers of additional bees, the numbers of dead additional bees, and the death rates (%) of additional bees of the test samples 2 to 4 are listed in Table 2 below.

The test insects fasted overnight were found to be dead in all the tests.

TABLE 2

| | Test sample | | |
| --- | --- | --- | --- |
| | 2 | 3 | 4 |
| Sugar content (Brix) | 20 | 40 | 63 |
| Number of additional bees | 9 | 9 | 10 |

TABLE 2-continued

| | Test sample | | |
|---|---|---|---|
| | 2 | 3 | 4 |
| Number of dead additional bees | 0 | 4 | 6 |
| Death rate (%) of additional bees | 0 | 44.4 | 60.0 |

From the results shown in Table 2, it was revealed that the test samples 3 and 4 having a sugar content (Brix) of 40 or more had a high lethal effect, due to imidacloprid used in combination, not only on the test insects that had eaten the test samples but also on the additional bees added later. This is considered as follows: the test insect that had eaten the test sample 3 or 4 gave (propagated) the test sample to the additional bees added later in a mouth-to-mouth manner, and as a result, a high lethal effect was exerted also on the additional bees added later, which had not eaten the test sample 3 or 4.

By contrast, the test sample 2 having a sugar content (Brix) of 20 did not have a lethal effect due to imidacloprid used in combination at all on the additional bees added later.

These test results reveal that a bait having a sugar content (Brix) of 40 or more (the test samples 3 and 4) is recognized by bees as a good food or a new feeding site, and a bee that has eaten the bait gives (propagates) the bait to other bees in a mouth-to-mouth manner.

When a bee has recognized the bait as a good food or a new feeding site, the bee that has eaten the bait will probably deliver the bait to its nest in order to give (propagate) the bait to other bees in the nest in a mouth-to-mouth manner, and thus when the poison bait has a sugar content (Brix) of 40 or more, the delivery of the bait to the nest by the bee can be facilitated.

<Propagation Verification Test 2>

(1) Preparation of Test Sample

Aqueous fructose solutions having sugar contents (Brix) of 60, 80, and 83 were prepared as test samples 5 to 7.

(2) Test Method

After 2 g of a 0.01 wt % imidacloprid solution in ethanol was added dropwise to a 85 mm×80 mm absorbent cotton piece and then dried, each of the test samples 5 to 7 in an amount of 4 g was infiltrated and made to be eaten by one test insect (honeybee, ♀) fasted overnight. Subsequently, the test insect that had finished eating was put in a metal cage (25 cm×25 cm×25 cm), and additional bees (honeybees: those living in the same nest as the test insect) in a number shown in "Number of additional bees" of Table 3 was put therein. After 14 hours, the number of dead additional bees in the metal cage ("Number of dead additional bees") was counted. The test was performed under room temperature (25° C.) conditions.

The sugar contents (Brix), the numbers of additional bees, the numbers of dead additional bees, and the death rates (%) of additional bees of the test samples 5 to 7 are listed in Table 3 below.

The test insects fasted overnight were found to be dead in all the tests.

TABLE 3

| | Test sample | | |
|---|---|---|---|
| | 5 | 6 | 7 |
| Sugar content (Brix) | 60 | 80 | 83 |
| Number of additional bees | 10 | 10 | 10 |

TABLE 3-continued

| | Test sample | | |
|---|---|---|---|
| | 5 | 6 | 7 |
| Number of dead additional bees | 7 | 8 | 0 |
| Death rate (%) of additional bees | 70 | 80 | 0 |

From the results shown in Table 3, it was revealed that the test samples 5 and 6 having sugar contents (Brix) of 60 and 80, respectively, had a high lethal effect, due to imidacloprid used in combination, not only on the test insects that had eaten the test samples but also on the additional bees added later. This is considered as follows: the test insect that had eaten the test sample 5 or 6 gave (propagated) the test sample to the additional bees added later in a mouth-to-mouth manner, and as a result, a high lethal effect was exerted also on the additional bees added later, which had not eaten the test sample 5 or 6.

By contrast, the test sample 7 having a sugar content (Brix) of 83 did not have a lethal effect due to imidacloprid used in combination at all on the additional bees added later.

These test results reveal that a bait having a sugar content (Brix) of less than 83 (the test samples 5 and 6) is recognized by bees as a good food or a new feeding site, and a bee that has eaten the bait gives (propagates) the bait to other bees in a mouth-to-mouth manner.

When a bee has recognized the bait as a good food or a new feeding site, the bee that has eaten the bait will probably deliver the bait to its nest in order to give (propagate) the bait to other bees in the nest in a mouth-to-mouth manner, and thus when the poison bait has a sugar content (Brix) of 40 or more and less than 83, the delivery of the bait to the nest by the bee can be facilitated.

<Propagation Verification Test 3>

(1) Preparation of Test Sample

In addition to using the test samples 6 and 7 in "Propagation verification test 2" above, that is, the aqueous fructose solutions having sugar contents of (Brix) 80 and 83, an aqueous fructose solution having a sugar content (Brix) of 70 was prepared as a test sample 8.

(2) Test Method

The test was performed using three nests which were kept indoors and where a known number of paper wasps inhabited.

After 2 g of a 0.15 wt % fipronil solution in ethanol was added dropwise to a 85 mm×30 mm absorbent cotton piece folded in two and then dried, each of the test samples 6 to 8 in an amount of 4 g was infiltrated and made to be eaten by one test insect (paper wasp). Subsequently, the test insect that had finished eating was returned to its nest, and the number of paper wasps died in the nest after 14 hours was counted.

The test insects that had eaten the test samples 6 to 8 were all found to be dead.

The test was performed under room temperature (25° C.) conditions.

The sugar contents (Brix) and the dead wasp rates (%), which are obtained by dividing the number of dead wasps (not including the test insect) by the number of wasps living in the nest, of the test samples 6 to 8 are listed in Table 4 below.

TABLE 4

| | Test sample | | |
| --- | --- | --- | --- |
| | 8 | 6 | 7 |
| Sugar content (Brix) | 70 | 80 | 83 |
| Dead wasp rate (%) | 80 | 58 | 0 |

As can be seen from the results shown in Table 4, it was revealed that also against paper wasps, the test samples 8 and 6 having sugar contents (Brix) of 70 and 80, respectively, had a high lethal effect, due to fipronil used in combination, not only on the test insects that had eaten the test samples but also on the wasps in the nests in a short time period of 14 hours. This is considered as follows: the test insect that had eaten the test sample 8 or 6 gave (propagated) the test sample to the wasps in the nest in a mouth-to-mouth manner, and as a result, a high lethal effect was exhibited. In addition, in the nest of the test insect that had eaten either the test sample 8 or 6, the queen wasp was dead, and the nest was in a state where its normal function could not be maintained.

By contrast, the test sample 7 having a sugar content (Brix) of 83 did not have a lethal effect due to fipronil used in combination at all on the wasps in the nest, and the nest functioned normally.

These test results reveal that also in the case of paper wasps, a bait having a sugar content (Brix) of less than 83 (the test samples 8 and 6) is recognized by wasps as a good food, and a wasp that has eaten the bait gives (propagates) the bait to other wasps in a mouth-to-mouth manner.

Also in the case of carnivorous wasps, when a wasp has recognized the bait as a good food, the carnivorous wasp that has eaten the bait will probably deliver the bait to its nest in order to give (propagate) the bait to other wasps in the nest in a mouth-to-mouth manner, and thus when the poison bait has a sugar content (Brix) of 40 or more and less than 83, the delivery of the bait to the nest by the wasp can be facilitated.

<Outdoor Test 1>

(1) Preparation of Test Sample

An example test sample (Example 1) having a sugar content (Brix) of 63 and a comparative example test sample (Comparative Example 1) having a sugar content (Brix) of 18 were prepared using an attractive component (liquor, vinegar, saccharide (composed mainly of sucrose), lactic acid bacteria beverage, etc.), a solvent (ethyl lactate), and water.

In addition, a comparative example test sample (Comparative Example 2) having a sugar content (Brix) of 15 was prepared by diluting a commercially available hornet attractant stock solution (manufactured by SHIMADA Corporation: Hornet Buster) with water in accordance with the directions for use.

(2) Test Method

Each of the example test sample (Example 1) and the comparative example test samples (Comparative Examples 1 and 2) in an amount of 100 g was infiltrated into two 170 mm×80 mm absorbent cotton pieces folded in two and housed in an empty container (a cylindrical plastic container 90 mm in diameter and 120 mm in height) of a commercially available wasp catcher. The containers were placed by hanging them from a tree which was near (about 30 m from) a hornet nest in a park in Kamigori Town, Hyogo Prefecture and around which hornets were often seen (2 m away from the line of movement of hornets and 2 m above the ground). For one month (September to October, 2018) from the placement, whether hornets came and went between the hornet nest and the containers housing the absorbent cotton pieces impregnated with the test samples was checked at about 15 o'clock on weekdays.

When the absorbent cotton pieces impregnated with the test samples were checked for their dryness and found to be dry, the corresponding test sample was added as required to such an extent that the absorbent cotton pieces became wet.

(3) Test Results

In Example 1 (sugar content (Brix): 63) in which the example test sample having a sugar content (Brix) of 40 or more and less than 83 was used, it was observed that a hornet came and went at least once a day between the hornet nest and the container housing the absorbent cotton pieces impregnated with the example test sample. Furthermore, regarding this container, it was also observed that a hornet gave (propagated) the bait to another hornet in a mouth-to-mouth manner.

By contrast, in Comparative Example 1 (sugar content (Brix): 18) and Comparative Example 2 (sugar content (Brix): 15) in which the comparative example test samples having a sugar content (Brix) of lower than 40 were used, one hornet approaching the container housing the absorbent cotton pieces impregnated with each comparative example test sample was observed, but delivery to the nest or mouth-to-mouth feeding (propagation) of the bait was not observed at all.

(4) Discussion

The results of "Outdoor test 1" above reveal that a bait having a sugar content (Brix) of 40 or more and less than 83 is recognized by hornets as a good food or a new feeding site, and a hornet that has eaten the bait delivers the bait to its nest.

Also from the results of this outdoor test as well as "Propagation verification test" above, it has been confirmed again that when a hornet has recognized the bait as a good food or a new feeding site, the hornet that has eaten the bait will probably deliver the bait to its nest in order to give (propagate) the bait to other hornets in the nest in a mouth-to-mouth manner, and thus when the poison bait has a sugar content (Brix) of 40 or more and less than 83, the delivery of the bait to the nest by the hornet can be facilitated.

<Outdoor Test 2>

(1) Preparation of Test Sample

An example test sample (Example 2) having a sugar content (Brix) of 71 was prepared using an attractive component (saccharide, syrup, lactic acid bacteria beverage, etc.), a solvent (ethyl lactate), a surfactant (polyoxyethylene hydrogenated castor oil), fipronil, and water.

(2) Test Method

A cylindrical nonwoven fabric having a diameter of 75 mm and a thickness of 20 mm and provided with six holes having a diameter of 13 mm was impregnated with 90 g of the example test sample (Example 2). The resultant was housed in a container equipped with an umbrella for prevention of the entry of rainwater (cylindrical container 100 mm in diameter, 30 mm in height, and 55 mm in height including the umbrella). The container was placed by hanging it from a tree near (about 2 m from) a hornet nest (about 40 cm in diameter) built on a Japanese cherry tree near a river in Kamigori Town, Hyogo Prefecture (0.5 m away from the line of movement of hornets and 1 m above the ground). After the placement, visual observation was carried out every day at about 18 o'clock to check whether hornets came and went between the hornet nest and the container housing the nonwoven fabric impregnated with Example 2 and, furthermore, whether the nest was destroyed. Here, "the nest is destroyed" means that the number of hornets entering or exiting the nest during five minutes becomes zero. The nest was judged to be destroyed at the time point when no hornets had entered or exited for five minutes.

(3) Test Results

Two days after the start of the test, it was observed that hornets frequently came and went between the container housing the nonwoven fabric impregnated with Example 2 and the hornet nest. Three days after the start of the test, only one hornet entered and exited the hornet nest, and four days after the start of the test, no hornets were observed to enter or exit the hornet nest. At about 18 o'clock on the day before the placement of the container housing the nonwoven fabric impregnated with Example 2, the number of hornets entering or exiting the hornet nest during five minutes was 45.

From these test results, it was revealed that the hornet nest having a diameter of about 40 cm was destroyed four days after the placement of the test sample.

(4) Discussion

The results of "Outdoor test 2" above reveal that when the sugar content (Brix) of a poison bait is 40 or more and less than 83, the palatability to wasps can be increased to facilitate the delivery of the poison bait to a wasp nest, and thus a high extermination effect on wasps can be exhibited to efficiently destroy the entire wasp nest.

<Outdoor Test 3>

(1) Test Method

The cylindrical nonwoven fabric impregnated with 90 g of the example test sample (Example 2) and housed in a container equipped with an umbrella for prevention of the entry of rainwater in "Outdoor test 2" above was used as a poison bait and disposed at locations of test numbers 1 to 4 with respect to four wasp nests shown in Table 5 below.

After the poison bait was disposed, whether wasps came and went between each wasp nest and the poison bait and, furthermore, whether the nests were destroyed were visually observed to determine the number of days from the placement to destruction. Here, "the nest is destroyed" means that the number of wasps entering or exiting the nest during five minutes becomes zero on visual observation after placement.

(3) Test Results is disposed at a specific place, wasps recognize the poison bait as a new food or a new feeding site at an early stage from the disposition, and, furthermore, since the poison bait has a sugar content (Brix) of 40 or more and less than 83, the delivery of the poison bait to the nest is facilitated, resulting in early destruction of the entire wasp nest.

INDUSTRIAL APPLICABILITY

When a poison bait has a sugar content (Brix) of 40 or more and less than 83, the poison bait is recognized by wasps as a good food or a new feeding site and has high palatability to wasps, and since a wasp that has eaten the poison bait gives (propagates) the bait to other wasps in the nest in a mouth-to-mouth manner, the delivery of the poison bait to the nest can be facilitated. Furthermore, when the poison bait having a sugar content (Brix) of 40 or more and less than 83 is disposed at a specific place, the entire wasp nest can be destroyed early.

That is, when a poison bait has a sugar content (Brix) of 40 or more and less than 83 and is disposed at a specific place, a high extermination effect on wasps is produced, and the entire wasp nest can be destroyed efficiently and early in the end; thus, the present invention is extremely useful.

The invention claimed is:

1. A method for destroying a wasp nest, comprising:
providing or offering a poison bait, wherein the poison bait has a sugar content (Brix) of 40 or more and less than 83, which increases palatability to wasps, wherein the sugar content (Brix) is a sugar refractometer reading of the poison bait, said poison bait containing an insecticide and one or more components selected from the group consisting of fructose, liquor, vinegar, sucrose, lactic acid bacteria beverage, and syrup;
disposing the poison bait in an area at least 1 meter away from and within 5 meters of a wasp nest to let wasps eat the poison bait;
thereby facilitating delivery of the eaten poison bait by the wasps to the wasp nest; and
propagating the eaten poison bait to other wasps, thereby destroying the wasp nest,
wherein the poison bait contains fructose.

TABLE 5

| | | Location | | | |
|---|---|---|---|---|---|
| Test number | Wasp nest (wasp species) | Distance from line of movement of wasps (m) | Distance from nest (m) | Height from flat surface (m) | Destruction of nest (days after placement) |
| 1 | Vespa simillima xanthoptera | 1.5 | 1.5 | 3 | 7 |
| 2 | Vespa simillima xanthoptera | 2 | 2.5 | 0 | 10 |
| 3 | Vespa simillima xanthoptera | 3 | 10 | 1 | 6 |
| 4 | Vespa crabro | 2 | 5 | 1 | 14 |

(4) Discussion

The results of "Outdoor test 3" above reveal that when a poison bait having a sugar content (Brix) of 40 or more and less than 83 is disposed in an area at least one meter away from a wasp nest and within three meters from the line of movement of wasps, the wasps recognize the poison bait as a new food or a new feeding site at an early point in time, and as a result, the wasp nest can be destroyed early, at the latest within two weeks from the disposition of the poison bait. This is considered as follows: when a poison bait having a sugar content (Brix) of 40 or more and less than 83

2. A method for destroying a wasp nest, comprising:
providing or offering a poison bait, wherein the poison bait has a sugar content (Brix) of 40 or more and less than 83, which increases palatability to wasps, wherein the sugar content (Brix) is a sugar refractometer reading of the poison bait, said poison bait containing an insecticide and one or more components selected from the group consisting of fructose, liquor, vinegar, sucrose, lactic acid bacteria beverage, and syrup;
disposing the poison bait in an area at least 1 meter away from and within 5 meters of a wasp nest to let wasps eat the poison bait;

thereby facilitating delivery of the eaten poison bait by the wasps to the wasp nest; and propagating the eaten poison bait to other wasps, thereby destroying the wasp nest, wherein the poison bait is stored in a container comprising a liquid-absorbing member, wherein the liquid-absorbing member contains the poison bait and has an upper surface side and a lower surface side along a vertical direction, wherein the liquid-absorbing member has at least one hole or recess extending from the upper surface side toward the lower surface side, said hole or recess having an opening sized for a single wasp's head to fit through, and wherein the poison bait contains fructose.

* * * * *